B. GARLLUS AND F. W. KNOTT.
METHOD AND MACHINE FOR FORMING GANGED BELT FASTENING HOOKS.
APPLICATION FILED JULY 5, 1917. RENEWED NOV. 6, 1919.
1,342,712.
Patented June 8, 1920.
5 SHEETS—SHEET 3.
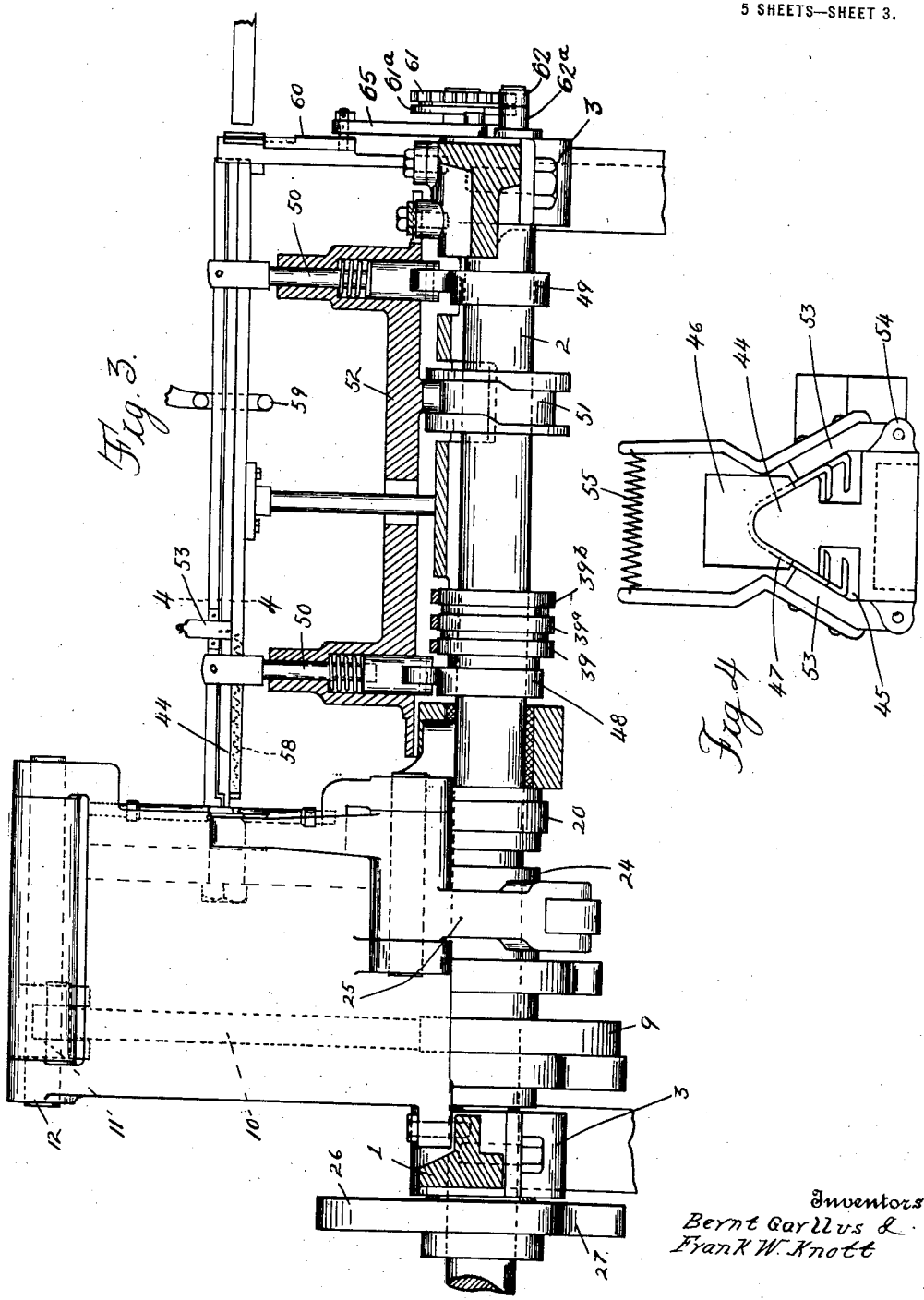
Inventors
Bernt Garllus &
Frank W. Knott
By Whittemore Hulbert & Whittemore
Attorneys

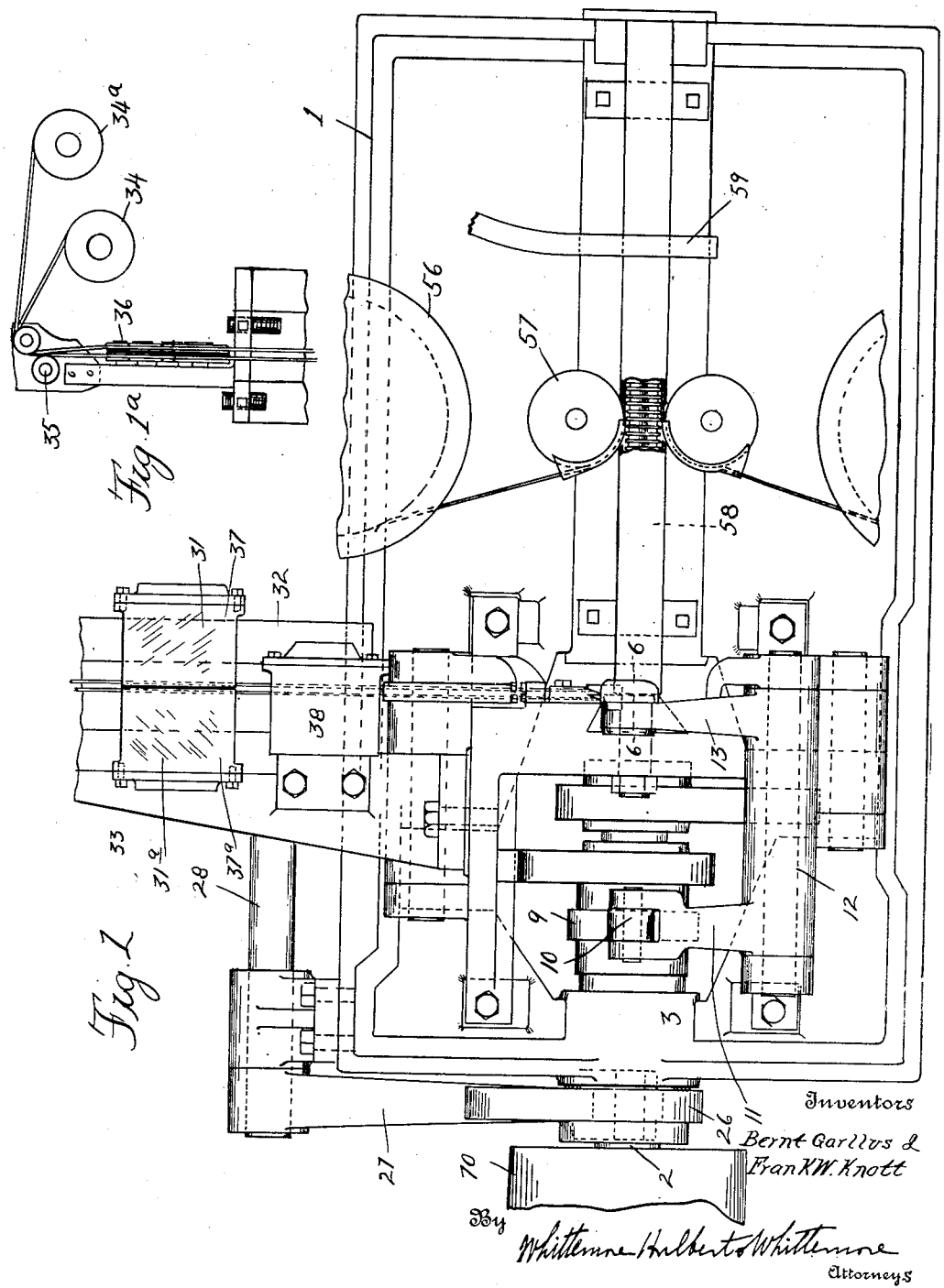

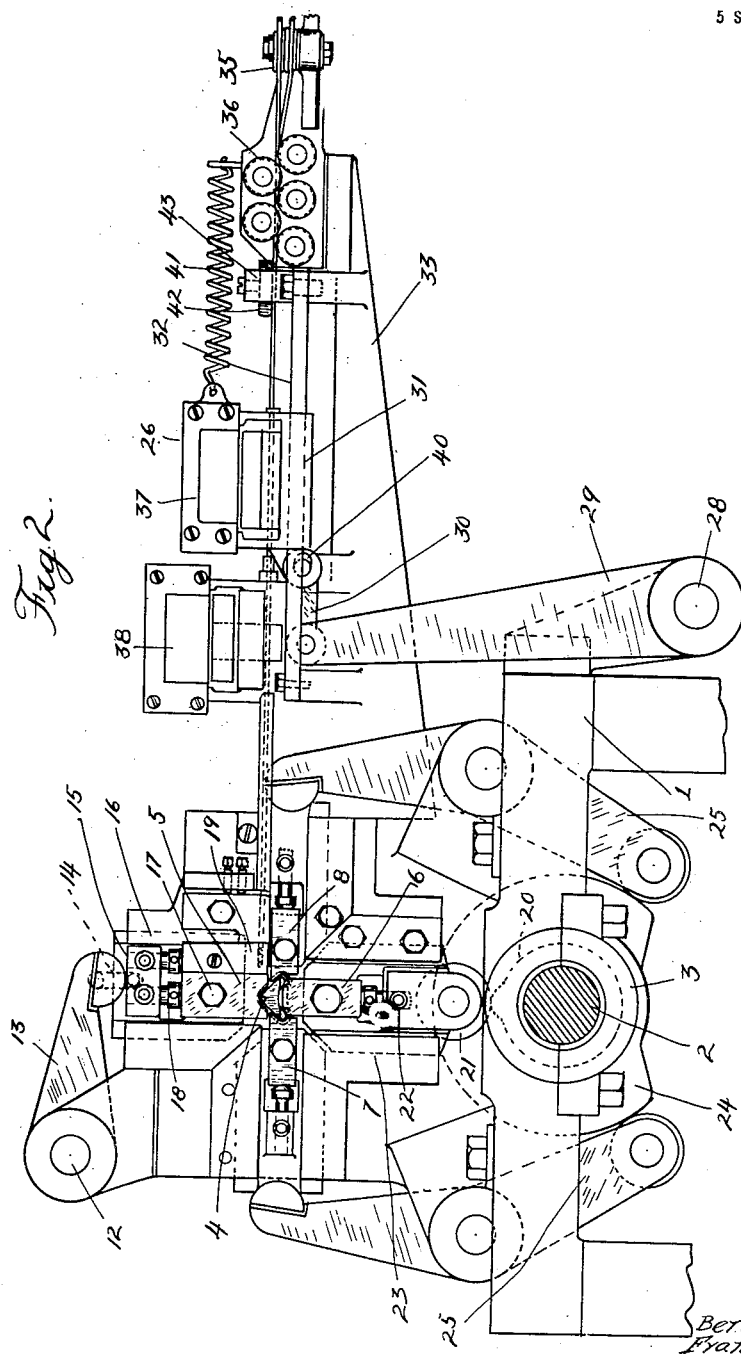

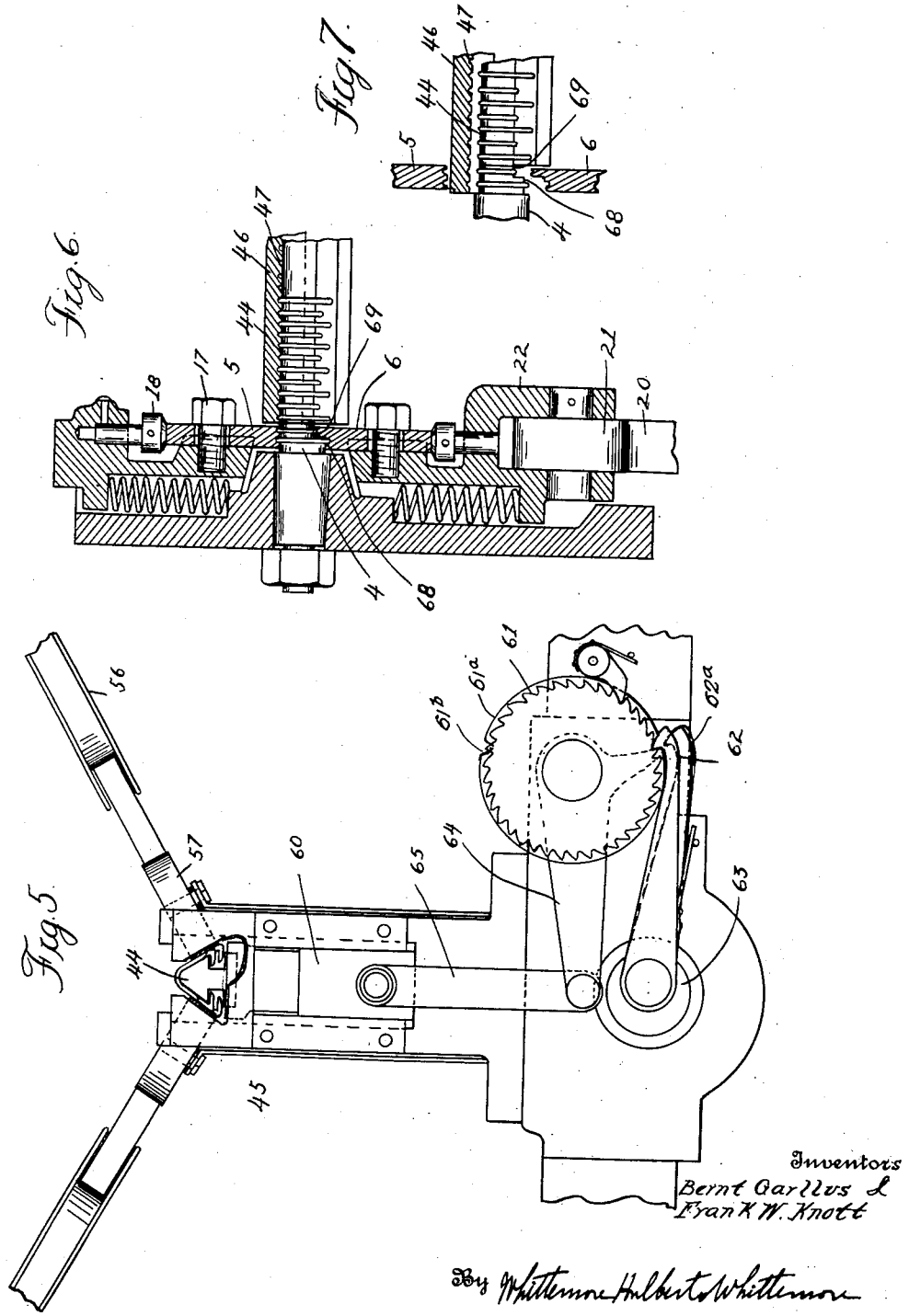

B. GARLLUS AND F. W. KNOTT.
METHOD AND MACHINE FOR FORMING GANGED BELT FASTENING HOOKS.
APPLICATION FILED JULY 5, 1917. RENEWED NOV. 6, 1919.

1,342,712.

Patented June 8, 1920.

Inventors
Bernt Garllus &
Frank W. Knott

By Whittemore Hulbert Whittemore
Attorneys

UNITED STATES PATENT OFFICE.

BERNT GARLLUS AND FRANK W. KNOTT, OF DETROIT, MICHIGAN, ASSIGNORS TO DETROIT BELT LACER COMPANY, OF DETROIT, MICHIGAN, A CORPORATION OF MICHIGAN.

METHOD AND MACHINE FOR FORMING GANGED BELT-FASTENING HOOKS.

1,342,712.  Specification of Letters Patent.  Patented June 8, 1920.

Application filed July 5, 1917, Serial No. 178,672. Renewed November 6, 1919. Serial No. 336,231.

*To all whom it may concern:*

Be it known that we, BERNT GARLLUS and FRANK W. KNOTT, citizens of the United States of America, residing at Detroit, in the county of Wayne and State of Michigan, have invented certain new and useful Improvements in Methods and Machines for Forming Ganged Belt-Fastening Hooks, of which the following is a specification, reference being had therein to the accompanying drawings.

The invention relates to the manufacture of belt fastenings of that type in which a series of staple hooks is attached to each end of the belt, said staples being then engaged with each other and held by a pin. It is the object of the present invention to obtain a ganged series of said hooks which are held in properly spaced relation during the operation of securing the same to the belt, the ganging means being external to the staples so as to in no wise interfere with attachment to the belt. It is a further object to gang the fasteners with non-metallic ganging strips and without the necessity of crimping or otherwise providing the strips with positioning means for said fasteners. Still further it is an object to obtain the product by a continuous operation in which the fasteners are formed and ganged in sequence. With these objects in view the invention comprises the novel features as hereinafter set forth.

In the drawings:

Figure 1 is a plan view of a portion of the machine;

Fig. 1ª is a plan view of a portion omitted in Fig. 1;

Fig. 2 is a front elevation of the fastener-forming mechanism;

Fig. 3 is a side elevation partly in section showing the mechanism for advancing the formed fasteners;

Fig. 4 is a cross-section on line 4—4 Fig. 3;

Fig. 5 is a front elevation illustrating the cut-off mechanism for the ganged strips;

Fig. 6 is a section on the line 6—6 of Fig. 1;

Fig. 7 is a detail view; and

Figs. 8 to 13 inclusive are detail views showing the different steps in the operation of bending the hooks.

Figure 14:
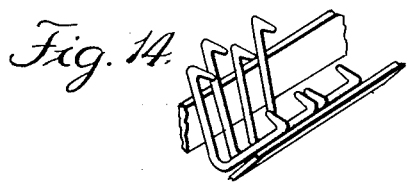

Fig. 14 is a perspective view showing the completed product of the machine.

In the use of belt-fasteners of the type above referred to, it is usual to attach a series of staples which are alternately provided with shanks of different lengths so as to have the hooks which pierce the belt in two different rows. Thus where the fasteners are ganged it is necessary to assemble the dissimilar fasteners in alternate arrangement, which greatly complicates the problem. My invention has solved the difficulty by forming the dissimilar fasteners in a predetermined relation to each other, such that they may be successively advanced from the position of formation to form a series. I have further provided means for attaching the ganging strips to the advancing series so that when delivered from the machine in which they are formed the fasteners are completely ganged. Still another feature is that the ganging strips are attached to the fasteners by an adhesive which is softened by heat, the strips being originally coated with said adhesive and the attachment being effected by the local application of heat to the fasteners when first brought into contact with said strips.

In general construction the machine for forming the ganged fasteners comprises mechanism for simultaneously fashioning a plurality of dissimilar fasteners in predetermined relation to each other; mechanism for removing and periodically advancing the formed fasteners to maintain the same relation therebetween and to form a series thereof; mechanism for feeding the ganging strips in contact with the series; means for causing adhesion between the strips and the fasteners in contact therewith; and means for severing the strips in suitable lengths. Various specific mechanisms may be employed in the general organization but preferably the machine is constructed as follows:

*Forming mechanism.*

1 is a suitable frame, in which is mounted the main shaft 2 journaled in bearings 3.

Above this shaft upon the frame are mounted forming dies, comprising an anvil 4, an upper vertically-reciprocating die 5, a lower vertically-reciprocating die 6 and laterally-reciprocating die members 7 and 8,—all being arranged in coöperative relation to the anvil 4. For actuating these die members there is a cam 9 upon the shaft 2, which through the medium of a linkage 10 operates a rock-arm 11 on a rock-shaft 12 parallel to the shaft 2 and in a higher plane. The rock-shaft 12 has a rock-arm 13 connected by a linkage 14 with a head 15 reciprocating in vertical guides 16 in the frame, said head having the die member 5 adjustably mounted thereon by means of a clamping bolt 17 and an adjusting screw 18. This same reciprocating head 15 carries a severing knife 19 which is independently adjustably secured thereto, the arrangement being such that the die 5 and cut-off 19 may be accurately set in relation to each other. The lower die member 6 is actuated by another cam 20 upon the shaft 2, which engages a roller bearing 21 on a reciprocating head 22 engaging vertical guideways 23, the die 6 being adjustably mounted on the head 22. The dies 7 and 8 are operated from a cam 24 on the shaft 2, which actuates rockable levers 25 upon opposite sides of the dies and suitably connected therewith. The various cams are so fashioned and timed in relation to each other as to produce the desired sequence of operations, as will be hereinafter described. The die members are also formed to simultaneously fashion a plurality of the fasteners, as will be subsequently described.

*Wire feeding mechanism.*

To provide stock for forming the fasteners a plurality of strands of wire are fed intermittently into such relation to the dies that portions thereof may be severed and fashioned. It is essential to provide accurate feeding mechanism for the wire in order that exact lengths may be severed and that the severed portions may be exactly positioned in relation to the dies. I therefore preferably employ electro-magnetic clutches for engaging and holding the strands, said clutches being mechanically actuated to produce the desired feeding operation, the mechanism being of the following construction:

26 is a cam upon the shaft 2 engaging a rock-arm 27 upon a parallel rock-shaft 28, and 29 is a vertically-extending rock-arm on the shaft 28, which is connected by a link 30 with slides 31 and 31ª engaging guideways 32 on an arm 33 projecting laterally from the frame 1. 34 and 34ª are reels of wire from which separate strands are led around shives 35 and between a series of rolls 36 for straightening the wire. The wire strands then pass in parallel relation along the arm 33 and through separate magnetic clutches 37 and 37ª mounted on the slides 31 and 31ª. Each clutch is of a construction such that when the electro-magnet 70 is energized the strand of wire is firmly gripped so as to prevent possibility of slipping, and thereby during the reciprocation of the slides 31 and 31ª advancing the strands therewith. Return of the wire is prevented by a holding magnetic clutch 38 mounted on the arm 33 in fixed position and adapted to grip both strands simultaneously. The clutches are energized and timed by circuit closers 39 39ª 39ᵇ, the movable members of which are rotative and mounted upon the shaft 2. Thus each reciprocation of the rock-arm 29 will cause the advancement of both strands of wire, the forward ends of which pass between forming and severing dies. It is, however, necessary to produce a differential advancement in the two strands,—as the fasteners simultaneously formed are not exactly similar and require stock of different length. This differential may be accurately adjusted by providing a lost-motion connection between the link 30 and the slides 31 and 31ª, as indicated at 40, and by returning the slides by springs 41 until arrested by adjustable stops 42. These stops, which as shown are screws engaging a stationary bearing 43 on the frame, may be set so that one of the slides is arrested in a position in advance of the other. This will cause the rock-arm 29 and link 30 to take up the lost motion and actuate the one clutch prior to the initial movement of the other, and as both slides terminate their movement at the same point the differential feeding will be effected.

*Series forming mechanism.*

To arrange the formed fasteners in series for ganging, mechanism is provided for withdrawing the fasteners from the anvil 4 after each forming operation but for retaining the same in the same spaced relation. This as shown comprises a guide 44 which is arranged in alinement with the anvil and is of the same general cross-sectional contour, having a rounded upper edge, divergent sides and grooves 45 in the sides for receiving the inwardly-bent hooks of the fasteners. Above the guide 44 is a feed member 46, which is grooved longitudinally to conform to the cross-section of the guide, and has in this groove transverse grooves or channels 47 for engaging individual fasteners. The member 46 is actuated by cams on the shaft 2, there being two cams 48 and 49 engaging vertically-reciprocated bars 50 secured to the member 46, and a cam 51 for imparting a reciprocating movement to a slide 52 in which the rods 50 are mounted. The slide 52 is actuated in a direction longitudinally of the guide 44 and the amplitude of movement is such as to advance the fasteners during each reciprocation a distance equal to twice the space between adjacent fasteners. This same spacing is maintained between the transverse grooves 47 in the feeder 46, and the arrangement is such that the feeder is first lifted to clear the fasteners on the guide, is then reciprocated into registration with the newly-formed fasteners on the anvil, is lowered to engage said fasteners and simultaneously engage all of the previously-formed fasteners which are on the guide 44, and then to move outward, advancing the entire series to a new position. During the interval in which the feed member 46 is disengaged from the fasteners they are held from displacement by clamping bars 53 on opposite sides of the guide 44, said bars being hinged at 54 and yieldably pressed against the guide by a spring 55.

Ganging mechanism.

The fasteners being arranged in series by the mechanism just described, to gang the same it is necessary to attach ganging strips thereto and preferably upon opposite sides thereof. I preferably use non-metallic ganging strips, and to quickly and securely attach the same to the individual fasteners the strips are pre-coated with a material which may be softened by heat to become adhesive and will quickly harden upon cooling. Such a material is shellac, which may be applied to one face of the paper strip, being non-adhesive at normal temperatures. The coated strips are preferably wound in reels and placed in holders 56 arranged in planes perpendicular to the divergent sides of the guide 44. From these holders the end of the strip is led around rolls 57, which press the strip against the guide and the fasteners arranged thereon. The coating on the strip is softened by a heater, preferably an electric heater 58 arranged beneath the guide 44 and in heat conducting contact therewith at a point adjacent to and in advance of the rolls 57. The heating effect is regulated to raise the temperature of the fasteners before contacting with the coated strip, so that they will melt the coating and embed themselves therein, and in the subsequent advancement of the series the strips will move with the fasteners maintaining the same relation until the coating is again hardened. If necessary, cooling means may be provided for more rapidly dissipating the heat, such for instance as an air current from a nozzle 59. Thus by the time the fasteners have traversed the full length of the guide 44 they will be securely attached to the strips and will be held from displacement when removed from the guide. The strips are periodically severed at the end of the guide by a cut-off mechanism 60, actuated by a timing mechanism comprising a ratchet-wheel 61, disk 61ª, pawls 62, and 62ª, eccentric 63 on the shaft 2, bell crank 64 and link 65. The pawl 62 engages the ratchet wheel and actuates said wheel and the disk 61ª in a step by step rotation. The pawl 62ª engages the disk 61ª and once in each revolution thereof enters a notch 61ᵇ in said disk, thereby engaging the short arm of the bell-crank and actuating the link 65 from the long arm thereof.

Dies and cut-off.

Figure 8:
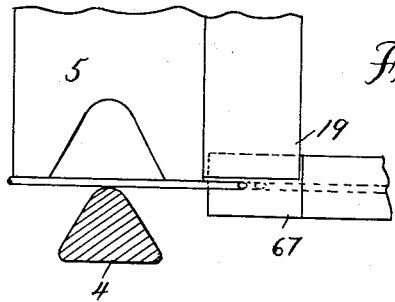
Figure 9:
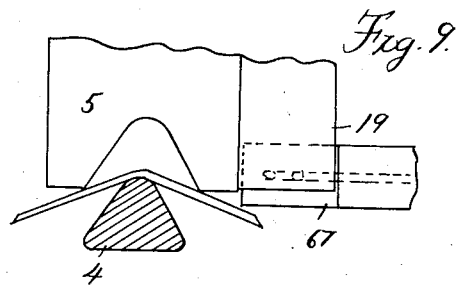
Figure 10:
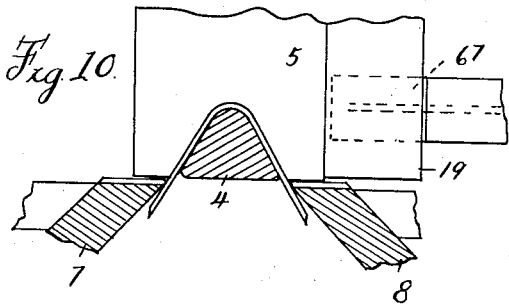
Figure 11:
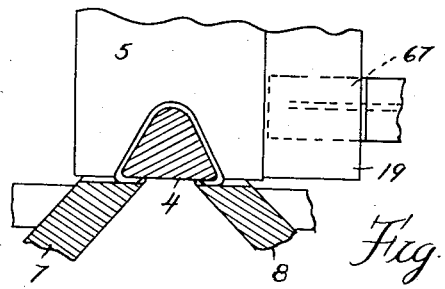
Figure 12:
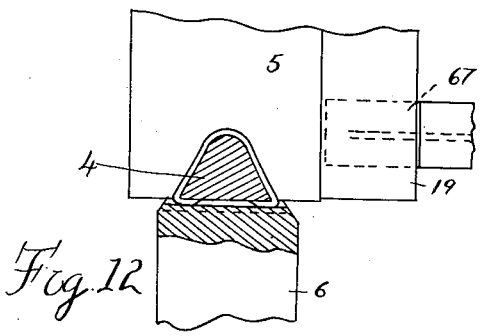
Figure 13:
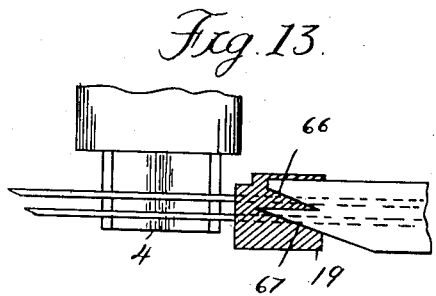

The fasteners are preferably of the form shown, having rounded, bent divergent sides and oppositely, inwardly-bent hooks which are sharpened and with their points spaced a sufficient distance to receive a belt of maximum thickness therebetween. Also the adjacent fasteners are of a different size, so that the pointed ends will be alternately in different lines. To form these fasteners it is first necessary to cut the stock of the proper relative lengths, this being determined by the adjustment of the stops 43 for the wire feed. The two strands are simultaneously severed by a pair of obliquely-arranged blades 66 and 67 on the cut-off 19, the angle of the blades forming the tapering points. It is, however, necessary to hold the severed blanks from displacement during the severing operation, which is accomplished by so timing the movement of the upper die 5 that it will engage the two strands slightly in advance of the contact of the blades 66 and 67. The die 5 is grooved to receive the strands, and so will hold them from lateral displacement, while the tension placed on the wire in bending it slightly over the upper edge of the anvil will prevent longitudinal displacement. Thus, as shown in Fig. 8, the unsevered wire crossing the anvil is clamped by the die 5. In Fig. 9, the severing has taken place and the severed strands are being bent by the continued downward movement of the die 5. In Fig. 10, the strands are bent into conformity to the divergent sides of the anvil, and the dies 7 and 8 are engaged therewith to bend the hooks inward or tuck the ends beneath the anvil. It will be noted that the underside of the anvil is stepped, as indicated at 68 and 69, and the tucking dies 7 and 8 are correspondingly stepped for engagement therewith, so that the forward fastener is shorter than the rear fastener. In Fig. 11, the tucking dies 7 and 8 have completed their operation and in Fig. 12 these tucking dies have been withdrawn and the bottom die 6 has been moved upward to complete the formation. In Fig. 7 the upper die 5 has been raised to disengage the same from the formed fasteners and to provide clearance for the feed bar 46, which as previously described is first lifted off from the guide 44, is then moved inward to overlap the anvil and then lowered to engage the newly-formed fasteners, which are then drawn off the anvil and on to the guide 44 in the forward movement of the bar 46.

*Complete operation.*

In the operation of the machine the wire for forming the fasteners is placed on the reels 34 and led about the shives 35 through the straightening rolls 36 and feeding and holding clutches 37 37ª and 38. Rolls of coated ganging strips are also placed in the holders 56 and the ends of the strips drawn downward around the rolls 57 adjacent to the guide 44. Current is passed through the electric heater and when the proper temperature is attained the machine is ready for operation. Motion is communicated to the machine through the pulley 70 which rotates the shaft 2 at the desired speed. This shaft actuates all of the mechanical moving parts and also times the operation of the electromagnetic clutches through the rotary circuit-closers 39 39ª 39ᵇ. Thus in each cycle or revolution of the shaft 2 the stock wire is advanced into operative relation to the forming dies and cut-off. The dies are operated to fashion the adjacent fasteners, the formed fasteners are drawn off from the anvil on to the guide 44 and the entire series of previously-formed fasteners on said guide is advanced thereon, maintaining the same spaced relation between adjacent fasteners. When the advancing series reaches the rolls 57 the fasteners will be at a temperature which will cause them to soften and embed themselves in the shellac on the paper strips. These strips will be fed forward with the advancing series and after passing out of the range of the heater and under the cooling influence of the air-jet 59 will be solidified, so that on reaching the end of the guide 44 each fastener is firmly attached to the strip. The series will continue to advance beyond the end of the guide until a suitable length has passed, when the operation of the cut-off 60 will sever the ganging strips to permit the withdrawal of the ganged unit.

What we claim as our invention is:

1. The method of forming ganged belt-fasteners, comprising the forming of a plurality of said fasteners in predetermined relation to each other, successively advancing the formed fasteners to produce a continuous series, feeding a ganging strip into contact with the advancing series and cementing the fasteners to said strip during said contact.

2. The method of forming ganged belt-fasteners, comprising the formation of a plurality of dissimilar fasteners in parallel and predeterminedly spaced in relation to each other, advancing the fasteners thus formed to produce a continuous series, advancing a ganging strip with the advancement of the series and in contact therewith, and cementing the fasteners to said strip while in contact.

3. The method of forming ganged fasteners, comprising the successive formation and advancement of individual fasteners to form an alined series, contacting a pre-coated ganging strip with said series and advancing the same therewith, and softening the coating of said strip during contact to effect adhesion of the same to the fasteners.

4. The method of forming ganged fasteners, comprising the successive formation and advancement of individual fasteners to form an alined series, feeding a pre-coated ganging strip in contact with said series and advancing the same therewith, and applying local heat to the fasteners and strip while in contact to soften the coating and to effect adhesion.

5. The method of forming ganged fasteners, comprising the simultaneous formation of a plurality of dissimilar fasteners in substantially parallel and predeterminedly spaced relation to each other, successively advancing the formed fasteners in the same relation to produce a continuous series, feeding coated ganging strips upon opposite sides of the series and maintaining the same in contact therewith during advancement, and heating the fasteners and strips while in contact at one point in their advancement to soften the coating and to effect adhesion.

6. A machine for forming ganged fasteners, comprising means for successively forming the fasteners, means for advancing the formed fasteners in continuous series and predeterminedly spaced relation, means for advancing a ganging strip with the advancing series and in contact with the fasteners thereon, and means for effecting adhesion between said strip and fasteners while in contact.

7. A machine for forming ganged fasteners, comprising means for successively forming the fasteners, means for advancing the formed fasteners in predeterminedly spaced relation to produce a continuous series, means for contacting a pre-coated ganging strip with the series and advancing the same therewith, and means for softening the coating of said strip while in contact with the fasteners to produce adhesion.

8. A machine for forming ganged fasteners comprising means for simultaneously forming a plurality of dissimilar fasteners in parallel and predeterminedly spaced relation to each other, means for successively advancing the formed fasteners maintained in the same relation to produce a continuous series, means for feeding ganging strips on opposite sides of the series in contact and simultaneously advanced therewith, and means for effecting adhesion between said strips and fasteners during said advancement.

9. A machine for forming ganged fasteners, comprising means for intermittently advancing a plurality of wires, associated cut-off and forming mechanism for fashioning severed lengths of said wires into fasteners, means for periodically advancing the formed fasteners to constitute a longitudinal series, and means for engaging a ganging strip with said fasteners during advancement.

10. In a machine for forming ganged fasteners, the combination with wire-severing means, of means for periodically and differentially advancing a plurality of wires in relation to said severing means to form severed portions of different lengths, forming mechanism for fashioning from the severed lengths parallelly-arranged dissimilar fasteners, means for disengaging the formed fasteners from the forming means and advancing the same periodically to form a series, and means for attaching a ganging strip to said fasteners during advancement.

11. In a machine for forming ganged fasteners, forming mechanism for simultaneously fashioning a plurality of fasteners in predetermined relation to each other, means for disengaging the formed fasteners from said forming means, maintaining the same spaced relation and periodically advancing the same to form a series, and means for ganging said fasteners during advancement.

12. In a machine for forming ganged fasteners, the combination with forming mechanism for simultaneously fashioning a plurality of dissimilar fasteners in predetermined spaced relation to each other, of means for removing and periodically advancing the formed fasteners, maintaining the same spaced relation to each other and to successively-formed fasteners to constitute a series, and means for ganging said fasteners while retained in such relation.

13. The combination with means for forming and advancing a series of fasteners in predetermined spaced relation to each other, of means for feeding a coated ganging strip in contact with said series, and means for heating and then cooling the contacting strip and fasteners to soften and harden the coating and thereby cause adhesion of the fasteners to the strip.

14. In a fastener forming machine, the combination with means for differentially advancing wires and cutting the same into predetermined lengths, of an anvil formed with steps respectively corresponding to said wires, dies for simultaneously forming lengths cut from the several wires into dissimilar fasteners upon the respective stepped portions of the anvil, and actuating means for said dies.

15. In a fastener forming machine, the combination with means for differentially advancing wires and cutting the same into predetermined lengths, of an anvil formed with steps respectively corresponding to said wires, dies for forming lengths cut from the several wires into dissimilar fasteners upon the respective stepped portions of the anvil, and actuating means for said dies.

16. In a fastener forming machine, the combination with means for differentially advancing wires and cutting the same into predetermined lengths, of an anvil formed with steps respectively corresponding to said wires, dies for simultaneously forming lengths cut from the several wires into dissimilar fasteners upon the respective stepped portions of the anvil, actuating means for said dies, and means for successively advancing the formed fasteners in spaced series.

17. In a fastener forming machine, the combination with means for differentially advancing wires and cutting the same into predetermined lengths, of an anvil formed with steps respectively corresponding to said wires, dies for forming lengths cut from the several wires into dissimilar fasteners upon the respective stepped portions of the anvil, actuating means for said dies, and means for successively advancing the formed fasteners in spaced series.

18. In a fastener forming machine, the combination with means for successively forming hooked fasteners with the hooks in different planes, of means for advancing the formed fasteners in a spaced series, and means for engaging a ganging strip with the fasteners while in such series relation.

19. In a fastener forming machine, the combination with means for successively forming fasteners, of means for arranging each newly formed fastener in a longitudinally spaced series including previously formed fasteners, and means for engaging a ganging strip with a plurality of said fasteners while in such series relation.

20. In a fastener forming machine, the combination with means for simultaneously forming a plurality of dissimilar fasteners, of means for simultaneously advancing the fasteners produced by each forming operation into a spaced series including previously formed fasteners, and means for engaging a ganging strip with a plurality of said fasteners while in such series relation.

21. In a fastener forming machine, the combination with an anvil, of means for successively forming fasteners thereupon, a holder for formed fasteners adjacent said anvil, and means for advancing a series of formed fasteners upon the holder after each forming operation and simultaneously removing a fastener from the anvil and adding it to said series.

22. In a fastener forming machine, the combination with an anvil, of means for successively forming fasteners thereupon, a holder for formed fasteners adjacent said anvil, means for displacing the fasteners as formed from the anvil to said holder and arranging them in a spaced series upon the holder, and means for engaging a ganging strip with a plurality of said fasteners while in such series relation.

23. In a fastener forming machine, the combination with mechanism for forming the fasteners, of a holder for the formed fasteners associated with said mechanism, a feed member for advancing the formed fasteners in a spaced series upon said holder, said member being grooved for engagement with the respective fasteners, and actuating means for said feed member.

24. In a fastener forming machine, the combination with mechanism for forming the fasteners, of a holder for the formed fasteners associated with said mechanism, a feed member for advancing the formed fasteners in a spaced series upon said holder, and means engaging the fasteners upon said holder maintaining their proper spaced relation when the feed member is disengaged therefrom.

25. In a fastener forming machine, the combination with mechanism for forming the fasteners, of a holder for the formed fasteners associated with said mechanism, a feed member for advancing the fasteners in a spaced series upon the holder, and means for reciprocating said feed member both longitudinally of the holder and transverse therewith to first disengage said member from the fasteners upon the holder, then shift it rearwardly of the series of fasteners, then engage said member with said fasteners and finally advance the series upon the holder.

26. In a machine for forming ganged fasteners, the combination with mechanism for successively forming the fasteners, of means for arranging the formed fasteners in a spaced series, means for engaging a coated strip with a plurality of said fasteners while in such series relation, and means for softening said coating to embed the fasteners therein.

27. In a machine for forming ganged fasteners, the combination with means for successively forming fasteners, of means for advancing the formed fasteners in spaced series relation, means for engaging a coated ganging strip with the fasteners while in such series relation, and means for heating the series of fasteners in advance of the point of application of the strip to soften said coating.

28. In a fastener forming machine, the combination with dies for forming two dissimilar fasteners, of mechanism for differentially advancing wires for respectively forming said fasteners comprising clutches respectively engageable with said wires, means for differentially advancing said clutches toward the dies, and a clutch engageable with the two strands simultaneously to prevent return thereof.

29. In a fastener forming machine, the combination with dies for forming two dissimilar fasteners, of mechanism for differentially advancing wires for respectively forming said fasteners comprising clutches respectively engageable with said wires, mechanism for advancing said clutches toward the dies having a lost motion connection with one of said clutches to accomplish the differential feed, and means for preventing return of the wires when released from said clutches.

30. In a fastener forming machine, the combination with dies for forming two dissimilar fasteners, of mechanism for differentially advancing wires for respectively forming said fasteners comprising clutches engageable with said wires, means for differentially advancing said clutches, spring means for returning the clutches, and means for preventing return motion of the wires when released from said clutches.

31. In a fastener forming machine, the combination with dies for forming the fasteners, of magnetic clutches engageable with a wire for respectively advancing said wire to said dies and retaining the wire against return motion, and means for energizing said clutches in a predetermined timed relation.

32. In a fastener forming machine, the combination with a stepped anvil, of means for feeding two strands of wire across the respective steps of said anvil, means for severing unequal lengths from the respective strands, and a die having steps complementary to those of the anvil for conforming said severed lengths to the respective steps of the anvil to form fasteners.

33. In a fastener forming machine, the combination with means for dissimilarly advancing two wires, of means for simultaneously severing unequal lengths from said wires, and a common means for forming dissimilar fasteners from said severed lengths.

34. In a fastener forming machine, the combination with means for dissimilarly advancing two wires in substantial parallelism, of means for simultaneously severing two blanks of unequal lengths from said wires, and a common means for forming dissimilar fasteners from said lengths.

In testimony whereof we affix our signatures.

BERNT GARLLUS.
FRANK W. KNOTT.